United States Patent [19]

Miller et al.

[11] 4,105,566

[45] Aug. 8, 1978

[54] DISPERSION FOR TIMBER TREATMENT

[75] Inventors: Glynn Miller, Oldbury; James E. Stephenson, Birmingham, both of England

[73] Assignee: Albright & Wilson Limited, Warley, England

[21] Appl. No.: 737,333

[22] Filed: Nov. 1, 1976

[30] Foreign Application Priority Data

Nov. 4, 1975 [GB] United Kingdom ............... 45843/75

[51] Int. Cl.$^2$ ........................... C09K 3/28; B27K 3/50
[52] U.S. Cl. ................................ 252/8.1; 106/15 R; 106/15 FP; 427/440; 428/921
[58] Field of Search .................... 252/8.1; 106/15 FP, 106/15 R; 428/921

[56] References Cited

U.S. PATENT DOCUMENTS

| | | | |
|---|---|---|---|
| 2,957,785 | 10/1960 | Leatherland | 106/15 |
| 3,222,158 | 12/1965 | Sowa | 106/15 |
| 3,398,019 | 8/1968 | Langguth et al. | 252/8.1 |
| 3,809,653 | 5/1974 | Sansing et al. | 252/8.1 X |

FOREIGN PATENT DOCUMENTS

| | | | |
|---|---|---|---|
| 2,418,859 | 11/1974 | Fed. Rep. of Germany | 252/8.1 |
| 2,047,489 | 3/1972 | Fed. Rep. of Germany | 252/8.1 |
| 1,192,130 | 5/1970 | United Kingdom | 423/313 |

*Primary Examiner*—Herbert B. Guynn
*Attorney, Agent, or Firm*—Flynn & Frishauf

[57] ABSTRACT

The invention provides a homogenous stable aqueous dispersion containing an organo-tin biocide and certain ammonium polyphosphate flame retardants which can be diluted and used to treat timber. The compositions further comprise a quaternary ammonium compound having surfactant activity, a derivative of carbamic acid and a hydrotrope which is an organic phosphate ester or an alkaryl sulphonate in order to maintain the active compounds in suspension. The biocidal activity is unaffected by the presence of the polyphosphate species.

28 Claims, No Drawings

DISPERSION FOR TIMBER TREATMENT

This invention relates to chemical compositions for application to wooden materials or to materials derived from wood in order to preserve them from attack by fungi and to render them flame-resistant.

A number of methods by which wood products may be treated in order to achieve one or both of the above effects are known in the timber treatment art. In their most convenient form these techniques comprise application of an aqueous based composition to the wood product using a variety of impregnation techniques. Clearly a single aqueous composition which would improve the properties of treated wood products in both of the above respects simultaneously would be advantageous, but so far as the applicants are aware no single composition is available which is effective in improving each of the properties detailed above to a satisfactory extent. Such compositions as are available for such a dual purpose have not gained any wide acceptance and it is conventional in the art to apply two or more separate compositions to wood products, one of which is designed to preserve the wood from fungal attack and the other is designed to increase the flame resistance of the wood.

One particular class of chemical compounds which are commonly applied to wood or wood products in order to preserve them from fungal attack are organo-tin compounds and in particular trialkyl substituted organo-tin compounds. While these compounds are extremely effective as anti-fungal agents they suffer from the practical disadvantage that their lack of water solubility has meant that they have generally been applied to wood products in the form of a solution in a suitable organic solvent. We have recently discovered that stable aqueous formulations comprising a trialkyl-tin anti-fungal agent could be prepared by the inclusion of a quaternary ammonium compound having surfactant activity into such a composition and also that such compositions when applied to wood products were especially effective in preserving them from fungal attack. Such compositions are described in our West German Patent Application No. 2,411,016, the relevant portions thereof being hereby incorporated by reference thereto. However, this discovery did not immediately enable useful aqueous compositions comprising such an anti-fungal system and a flame retardant to be formulated. Although such compositions are applied to the timber in a dilute form their practical utility as articles of commerce is dependent upon the stability of a more concentrated stable composition which can be manufactured, sold and stored without any deterioration.

One commonly employed group of chemical compounds with which wood products are impregnated in order to render them flame resistant are the ammonium salts of ortho- and poly-phosphoric acids. Such compounds are available at a relatively low cost and can be applied to wood products in the form of an aqueous solution in order to impart a degree of flame resistance which is satisfactory for most uses. Such phosphates have not previously been employed as part of a combined anti-fungal-flame proofing composition for wood products as it was widely believed that such phosphorus containing compounds would act as nutrients for fungi and hence render the composition less effective in preserving wood products from fungal attack. In any case the incorporation of the ammonium salts of orthophosphoric acid, which are the most widely used ammonium phosphate flame retardants, into an aqueous composition comprising an organo-tin anti-fungal agent and a quaternary ammonium compound as herein before described results in the precipitation of organo-tin compound from the composition.

We have now discovered a particular group of ammonium polyphosphates containing flame retardant compositions which may be incorporated into an aqueous organo-tin containing anti-fungal compositions as hereinbefore described in the presence of certain compounds having hydrotropic activity which appear to stabilise the system, and enables a stable aqueous composition to be formulated both as a concentrated product of commerce and as a dilute composition which can be used to impregnate wood products in order to simultaneously render them flame resistant and to preserve them from fungal attack.

The flame proofing compositions useful according to our invention are described in our copending U.K. application No. 55535/73. Such compositions contain a mixture of the ammonium salts of a plurality of polyphosphoric acids which mixtures may be obtained by the neutralisation of concentrated aqueous solution of phosphorus pentoxide with a suitable base in such a manner as to minimise the hydrolysis of the polyphosphate species present in the acid solution. Such solutions of phosphorus pentoxide will comprise from 80 to 86% by weight of phosphorus pentoxide and will preferably comprise from 80 to 84, say 80 to 82% by weight of $P_2O_5$. They may be obtained by dissolution of phosphorus pentoxide in water or in orthophosphoric acid, by concentration of orthophosphoric acid solutions or by dilution of more concentrated aqueous solutions of phosphorus pentoxide. These solutions comprise various mixtures of polyphosphoric acid species which are in equilibrium. The neutralisation of these acid solutions is carried out so as to minimise any hydrolysis of the polyphosphate species, for example, by the methods described in British Patent 1192130 and in our copending British Application No. 55272/72 now published as U.K. Pat. No. 1460710, i.e. by maintaining the temperature and pH of the reaction mixture during the neutralisation in the ranges 15° to 70° C, preferably 15° to 40° C and 4 to 12, preferably 6 to 10 respectively.

The flameproofing compositions which are described in our copending application 55535/73 now published as U.K. Pat. No. 1504507 optionally contain at least one derivative of carbamic acid having at least two amino groups per molecule which additives improve the fastness of the flameproofing finish.

Such carbamic acid derivatives are essential ingredients of the combined anti-fungal flameproofing compositions of this invention. They play an essential part in stabilising the concentrated dispersions in addition to their previous function. Particularly suitable derivatives for present use are urea, guanidine and dicyandiamide, the use of urea being particularly preferred.

Surprisingly we have discovered that the incorporation of the phosphorus containing flameproofing solutions into an anti-fungal composition in no way affects the degree of preservation from fungal attack which is imparted by a given quantity of anti-fungal agent.

The tri-alkyl tin compounds which may be included in the novel compositions of the invention are those having either of the formulae I or II.

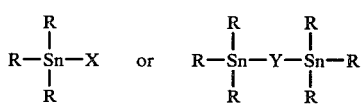

I          II wherein R represents the same or different alkyl groups having from 1 to 10 carbon atoms, Y represents an oxygen atom or a sulphur atom and X represents a halogen atom, an acetate group or an acrylate or methacrylate group.

The quaternary ammonium compound employed in the compositions of our invention may be any of those compounds disclosed for use in our copending applications 11419/73 and 28544/73. These compounds are characterised by their exhibiting surfactant properties.

Stable aqueous dispersions comprising these anti-fungal and flameproofing systems can be formulated in both concentrated and dilute form by the incorporation of certain hydrotropic agents. Hydrotropes are a class of chemical compounds having hydrophilic-hydrophobic properties which are recognised as being capable of increasing the aqueous solubility of sparingly soluble organic compounds. A number of individual compounds or groups of compounds are known which exert such an effect in at least some systems. We have discovered that a limited number only of compounds which are known to exhibit hydrotropic activity can act so as to stabilise aqueous dispersions comprising a trialkyl tin compound, a quaternary ammonium compound, an ammonium polyphosphate mixture and a carbamic acid derivative as hereinbefore defined. Compounds which we have discovered to possess this property are those of the formula:

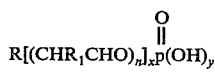

wherein $R_1$ represents a hydrogen atom or a methyl group, $n$ has an average value in the range 5 to 9, R represents the same or different branched or straight chain alkyl or alkyl substituted aromatic group having from 8 to 15 carbon atoms, $x$ has a value of 1 or 2; $x + y$ is 3 and the molar ratio of compounds wherein the value of $x$ is 1 to those wherein the value of $x$ is 2 is in the range 1.3 : 1.0 to 10.0 to 1.0.

A further class of compounds which we have discovered can be used to stabilise the aqueous dispersions of the invention comprises the alkali metal, ammonium or substituted ammonium salts of the xylene sulphonic acids.

The relative proportions of the active ingredients in the dispersions of this invention will be such as are conventionally used in the timber treatment art. The dispersions will be normally employed in timber treatment in a relatively dilute form again according to the well recognised techniques of the art although it will be recognised that they may be advantageously prepared in a more concentrated form. These concentrations and relative quantities may be varied according to the desired end use.

Accordingly this invention provides stable aqueous dispersions comprising from 0.01 to 2.0% by weight of a compound of the formula:

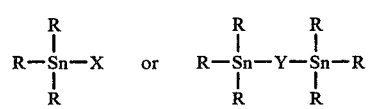

I          II wherein each R may be the same or different alkyl groups having from 1 to 10 carbon atoms, Y represents an oxygen atom or a sulphur atom and X represents a halogen atom, an acetate group, or an acrylate or methacrylate group; from 0.02 to 15.0% by weight of a quaternary ammonium compound having surfactant activity; from 0.1 to 55% by weight of a mixture of the ammonium salts of a plurality of polyphosphoric acids which mixture has been produced by the neutralisation of an aqueous solution comprising from 80 to 86% by weight of phosphorus pentoxide with ammonia or a basic derivative thereof in such a manner as to substantially avoid any hydrolysis of the polyphosphoric acid species present — from 0.05 to 30.0% by weight of a derivative of carbamic acid comprising at least two amino groups per molecule and from 0.02 to 3.0% by weight of one or more hydrotropes selected from the group comprising phosphate esters of the formula:

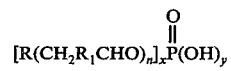

wherein $R_1$ represents a hydrogen atom or a methyl group, $n$ has an average value in the range 5 to 9, R represents the same or different branched or straight chain alkyl groups or alkyl substituted aromatic hydrocarbon groups having from 8 to 15 carbon atoms; $x$ has a value of 1 or 2, $x + y$ equals 3 and the molar ratio of the compounds wherein $x$ has a value of 1 to those wherein $x$ has a value of 2 is in the range of 1.3 : 1 to 10.0 : 1.0 and the ionic salts of a xylene sulphonic acid, and at least 55% of water (based on the total weight of the dispersion).

All weights above are expressed on the basis of the dry weight of the dispersion with the exception of the quantity of water. It will be appreciated that the ammonium polyphosphate salts will inevitably be prepared as an aqueous solution and that allowance for this water content should be made when formulating a dispersion according to this invention.

We have discovered that these dispersions may be prepared in the form of a stable concentrate comprising at least 55% by weight of water. They can be employed directly to impregnate wood or wood products in order to render them resistant to fungal attack and to flame. Usually this impregnation will be carried out using a relatively dilute dispersion in which the water content has been increased to a value of from 80 to 90% by weight. The degree of dilution of any particular dispersion will be such as to provide an adequate loading of the treated wood product with the treatment chemicals.

The organo-tin compound is preferably present in an amount of from 0.1 to 1.0% by weight of the dry weight of the dispersion. Preferably these compounds are substituted with alkyl groups R which have from 2 to 6 carbon atoms. Most preferably the alkyl substituents are butyl groups, normal butyl groups i.e. ethyl, propyl, butyl, amyl or hexyl groups including isomers thereof being especially preferred.

Specific organo-tin compounds which are of value according to our invention are:

Bis (tri n-butyl tin) oxide
Bis (tri n-butyl tin) sulphide
Tri n-butyl tin acetate
Tri n-butyl tin acrylate
Tri n-butyl tin methacrylate
Tri n-butyl phosphate
Tri n-butyl tin chloride The quaternary ammonium compound which may be incorporated into the novel dispersions of the invention may be any such compound which is capable of acting as a surfactant. Compounds useful according to this invention are those having the formula:

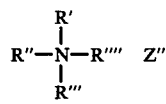

wherein each R', R", R'" and R"" which may be the same of different, may represent a branched or straight chain alkyl group having from 1 to 20 carbon atoms, an alkaryl group of 7 – 19 carbon atoms, e.g. tolyl, an aralkyl group to 7 to 27 carbon atoms, e.g. benzyl or alkyl benzyl or aryl group of 6 – 20 carbon atoms, e.g. aromatic hydrocarbyl group such as a phenyl group, or any corresponding alkylene oxide condensation thereof — or any two of R', R", R'" may form a saturated or unsaturated heterocyclic ring having 5, 6 or 7 ring atoms in which the quaternary nitrogen is the only hetero atom in the ring as in pyridine or with one or more additional hetero atoms in the ring e.g. an oxygen atom so as to form a morpholine or an oxazole ring, Z" represents a water solubilising anion, e.g. a halide ion such as a chloride or bromide ion or a sulphate ion.

Preferably R' is a benzyl or a nuclear alkylated benzyl group having at least one alkyl substituent with e.g. 1 to 20 usually 8 to 15, preferably about 12 carbon atoms or an alkyl group having from 8 to 20, preferably 12 to 16 carbon atoms. R" and R'" are alkyl groups having from 1 to 6 carbon atoms, preferably being methyl groups and R"" is a phenyl oxyalkylene or phenyl polyoxyalkylene group having from 1 to 6, preferably 1 to 2 oxyalkylene radicals or an alkyl group having from 1 to 20, more preferably 8 to 18 and especially about 12 carbon atoms. Oxyalkylene radicals in the groups represented by R"" are usually of 2 to 4 carbon atoms, and are preferably ethylene oxide or propylene oxide groups.

Particular quaternary ammonium compounds which are of use according to this invention include: benzalkonium chlorides of the formula:

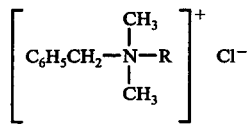

wherein R represents a mixture of alkyl groups having from 8 to 18 carbon atoms but is predominantly $C_{12}$, benzethonium chloride

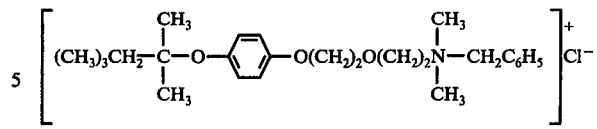

and methyl benzethonium chloride, hexadecyl pyridinium chloride,

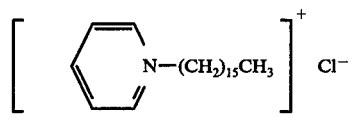

and hexadecyl pyridinium bromide, hexadecyl trimethyl ammonium bromide, N (acylolamino formyl methyl) pyridinium chloride, Phenoxyethyldimethyl ammonium bromide, di-n-octyl dimethyl ammonium bromide, n-dodecyl trimethyl ammonium chloride.

The quaternary ammonium compound will preferably comprise from 0.4 to 5.0%, more preferably from 1.5 to 3.0% by weight of the dry weight of the dispersion.

The ammonium polyphosphate mixtures will normally comprise from 2 to 30%, preferably from 15 to 25% by weight of the dispersion based upon the dry weight of the dispersion.

The most preferred derivative of carbamic acid for use in the present invention is urea. The derivative of carbamic acid will preferably comprise from 1 to 20%, more preferably from 5 to 15% by weight of the dry weight of the dispersion.

The phosphate ester hydrotropes useful according to this invention may be obtained by the reaction of an ethoxylated or propoxylated aliphatic or alkyl substituted aromatic alcohol or phenol with a suitable phosphorylating agent. Preferably they are derived from ethoxylated primary secondary or tertiary alcohols, more preferably from ethoxylated fatty alcohols having from 10 to 16 or most preferably from 11 to 15 carbon atoms per molecule or mixtures thereof. Such alkoxylated alcohols will preferably comprise from 5 to 9 moles of ethylene and/or propylene oxide per molecule. The products which are obtained by reacting such an alkoxylated alcohol or phenol with a suitable phosphorylating agent e.g. phosphorus pentoxide will normally comprise a mixture of di-esters and mono-esters of phosphoric acid. Mixtures of such phosphate esters useful according to this invention will preferably comprise such mono and di-esters in a molar ratio of from 1.5 : 1 to 2.0 : 1.

The xylene sulphonates may be individual isomeric compounds of the formula $(CH_3)_2(C_6H_3)SO_3^-M^+$ where $M^+$ represents an alkali metal or ammonium cation. Conveniently they will comprise a mixture of such isomers which has been obtained by sulphonating a mixture of isomeric xylenes.

The hydrotropic agents i.e. the phosphate esters or xylene sulphonic acids will preferably comprise from 1 to 12% by weight of the dry weight of the dispersion of the invention. More preferably from 3 to 7% by weight of such hydrotropic agents will be employed.

From a second aspect our invention provides a process for the treatment of wood or of a solid product derived therefrom so as to render it resistant to fungal attack and to flame which comprises impregnating the said wood or product with an aqueous dispersion as hereinbefore defined.

The relative proportions of each of the active components of these dispersions and their concentration in these dispersions will be selected according to the known criteria of the anti-fungal and flame resistant treatment arts so as to provide the desired loading of each on the particular wooden substrate using a particular method of impregnation. Thus quaternary ammonium compound and the organo-tin compound will generally be present in a weight ratio of from 2 : 1 to 6 : 1, preferably substantially 4 : 1 while the ammonium polyphosphate and the combined organo tin and quaternary ammonium compound will generally be present in a weight ratio of from 30 : 1 to 5 : 1, preferably substantially 15 : 1. The processes of treating wood products provided by the invention are of special utility when applied to timber or to wooden boards such as plywood, chipboard, fibreboard and strawboards.

The treatment of wood or of products derived therefrom may be accomplished in a number of ways. The wood may be soaked in an aqueous dispersion as hereinbefore described until sufficient absorption is achieved. However, preferably, the dispersions are applied to the timber using vacuum and/or pressure impregnation techniques which are designed to ensure that absorption of the dispersion into the substrate takes place. Thus the wood or wood product may be contacted with an aqueous dispersion of the invention in a closed vessel and the pressure within said vessel raised above atmospheric pressure for a given period sufficient so as to achieve the desired degree of absorption. The pressure is then returned to normal. In a preferred technique the wood is placed within a closed vessel and prior to the aqueous dispersion being brought into contact with the wood, the pressure within the vessel is reduced to a level below atmospheric pressure; the dispersion is then admitted to the vessel, normally at room temperature, and the pressure increased to a level above atmospheric pressure and this reduced pressure is maintained until sufficient absorption is achieved. Optionally the pressure within the vessel may subsequently be reduced to a level below atmospheric pressure. These impregnation techniques, with or without the initial pressure are known as the "Full Cell" and "Empty Cell" techniques and are described in "The Preservation of Timber" by W. P. K. Findlay, published by Black (1962) and "Wood Preservation" by G. M. Hunt and G. A. Garrett, 3rd Edition American Forestry Series, published by McGraw-Hill in 1967.

The degree of absorption of the dispersions of the invention by the wood is affected by the concentration of the dispersion, the nature of the wood and the time for which super or sub-atmospheric pressure is maintained during the impregnation step. Thus increasing the concentration of the dispersion or the time for which sub or super-atmospheric pressure is maintained or decreasing the sub-atmospheric pressure used all tend to increase the amount of absorption of the dispersion by the wood. In general the concentration of the organo-tin compound and ammonium polyphosphate will be similar to that previously used in the art. Thus dispersion containing from 0.1 to 0.25% by weight of organo-tin compound and 5 to 15% by weight of ammonium polyphosphate are preferred.

The invention is illustrated by the following Examples:

EXAMPLE 1

A solution of a plurality of ammonium polyphosphate obtained by the neutralisation of an aqueous polyphosphoric acid containing 82% by weight of $P_2O_5$ comprising 406 gm of said polyphosphates, 196 gm of urea in 518 gm of water was mixed with 98 gm of an ethoxylated lauryl phosphate ester derived from lauryl alcohol comprising 6 ethylene oxide groups per molecule; the ratio of mono to di phosphate esters being 1.5 : 2.0. 112 gm of a dispersion of bis (tributyl-tin) oxide and 700 gm of water were added to the mixture with stirring at ambient temperature.

The bis (tributyl tin) oxide dispersion comprised 1 part by weight of bis (tributyl-tin) oxide with 8 parts of Benzalkonium BP with one part of water. Benzalkonium BP is a trade name for an aqueous formulation containing 50% by weight of an alkyldimethyl ammonium chloride wherein the alkyl groups contain 8 to 18 carbon atoms.

After stirring for 30 minutes a homogeneous opalescent stable dispersion was obtained.

EXAMPLE 2

1 part by volume of the dispersion prepared above was diluted with 2 parts of water to provide a dispersion suitable for impregnating wood. 6 blocks of Scots Pine measuring 300 mm by 95 mm by 12.5 mm where placed in an autoclave and the pressure reduced to 0.1 atmospheres. This pressure was maintained for 30 minutes. The impregnating dispersion was admitted to the autoclave and the pressure raised to 10 atmospheres. This pressure was maintained for a period of 90 minutes. The impregnating solution was then drained from the autoclave and the pressure reduced to 0.1 atmospheres. This reduced pressure was maintained for 10 minutes. The wood blocks were allowed to dry to constant weight at 23° C and 65% relative humidity.

The flame resistance of these blocks was then tested according to British Standard 476 Part 7 1971 small scale test with the following results:

| Specimen | 1 | 2 | 3 | 4 | 5 | 6 |
|---|---|---|---|---|---|---|
| Dry salt retention (kg m$^{-3}$) | 85 | 85 | 90 | 80 | 90 | 94 |
| Flame spread (mm) | 70 | 25 | 80 | 40 | 40 | 40 |

These results indicate a satisfactory degree of flame resistance such as is required by this standard test.

EXAMPLE 3

The anti-fungal activity of a dispersion prepared according to Example 1 was compared with that of dispersion comprising 1 part of bis (tributyl-tin) oxide, 8 parts Benzalkonium Chloride and 1 part water (all parts expressed as parts by weight).

The two dispersions were diluted to a variety of concentrations and these dispersions were used to impregnated sapwood blocks of Scots pine measuring 14.5 mm by LO mm by 7MM. The concentration of bis (tributyl-tin) oxide used as as follows (parts by weight):

| 1) | Dispersion A (with fire retardant) | | | | | | | |
|---|---|---|---|---|---|---|---|---|
| | 0.16 | 0.10 | 0.63 | 0.40 | 0.25 | 0.16 | 0.10 | 0.0063 |
| 2) | Dispersion B | | | | | | | |
| | 0.63 | 0.40 | 0.25 | 0.16 | 0.10 | | | |

The dried blocks were exposed for 6 weeks to actively growing soil feeder block cultures of the Brown rotting Basidiomycete Coniophera cerebella. The loss in weight for each block was then determined. The highest concentration of bis (tributyl-tin) oxide permitting decay and the lowest concentration permitting decay were determined for dispersions A and B; the difference between these two figures being the toxic limit of that system. A comparison of the results is given in the table below:

|   | As solution concentration (% by weight) | Loading on wood (kg m$^{-3}$) |
|---|---|---|
| A | 0.0063 – 0.010 | 0.045 – 0.072 |
| B | 0.010 | 0.072 |

These results demonstrate that the anti-fungal activity of the bis (tributyl-tin) oxide is unaffected by the addition of the ammonium polyphosphate phosphate ester and urea.

What we claim is:

1. An aqueous composition comprising from 0.01% to 2.0% by weight of an organotin compound of the formula I or II

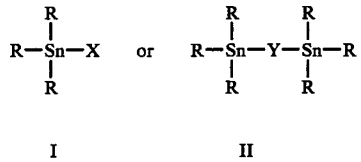

I  II wherein each R is the same or different alkyl groups having from 1 to 10 carbon atoms, Y is an oxygen atom or a sulphur atom, and X is a halogen atom, an acetate group or an acrylate or methacrylate group;

from 0.02% to 15.0% by weight of a quaternary ammonium salt having the formula

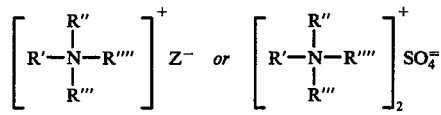

wherein R'' and R''' are selected from the group consisting of alkyl groups having from 1 to 6 carbon atoms, R' is a benzyl group, a nuclear alkylated benzyl group having an alkyl substituent containing from 8 to 15 carbon atoms, or an alkyl group having from 8 to 20 carbon atoms, R'''' is a phenyl oxyalkylene group containing from 1 to 6 oxyalkylene groups or an alkyl group having from 8 to 18 carbon atoms, and Z is a halide;

from 0.1% to 55% by weight of a mixture of the ammonium salts of a plurality of polyphosphoric acids which mixture has been produced by the neutralization of an aqueous solution comprising from 80 to 86% by weight of phosphorus pentoxide with ammonia or a basic derivative thereof at a temperature of from 15 to 70° C and a pH of from 4 to 12 to substantially avoid any hydrolysis of the polyphosphoric acid species present;

from 0.05% to 30% by weight of a derivative of carbamic acid selected from the group consisting of urea, dicyandiamide and quanidine;

from 0.02% to 3.0% by weight of one or more hydrotropes selected from the group consisting of (i) phosphate esters of the formula

wherein R, is a hydrogen atom or a methyl group, n has an average value in the range 5.0 to 9.0, R$^5$ is the same or different branched or straight chain alkyl group or alkyl substituted aromatic hydrocarbon group having from 8 to 15 carbon atoms, x is 1 or 2, $x+y=3$ and the molar ratio of the compounds wherein x has a value of 1 to those wherein x has a value of 2 is in the range 1.3 : 1 to 10.0 : 1, and (ii) the alkali metal or ammonium salts of a xylene sulphonic acid (all weights being expressed on the dry weight of the dispersion); and at least 55% by weight of water (based on the weight of the aqueous dispersion).

2. A composition according to claim 1 which comprises from 80 to 90% by weight of water.

3. A composition according to claim 1 wherein the quaternary ammonium compound is of the formula

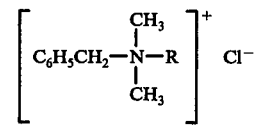

wherein R is a mixture of alkyl groups having from 8 to 18 carbon atoms but is predominantly C$_{12}$.

4. A composition according to claim 1 wherein the phosphate ester is present as a mixture of mono ester and di esters which are present in a molar ratio of from 1.5 : 1 to 2.0 : 1.

5. A composition according to claim 1 wherein the organotin compound is present in a quantity of from 0.1 to 1.0% by weight of the dry weight of the dispersion.

6. A composition according to claim 1 wherein in the compounds of formula I or II the group R represents an alkyl group containing from 2 to 6 carbon atoms.

7. A composition according to claim 6 wherein the group R represents a butyl group.

8. A composition according to claim 7 wherein the organotin compound is bis(tri-n-butyltin) oxide.

9. A composition according to claim 8 wherein the organotin compound is present in a quantity of from 0.1 to 1.0% by weight of the dry weight of the dispersion.

10. A composition according to claim 8 wherein the quaternary ammonium compound is of the formula

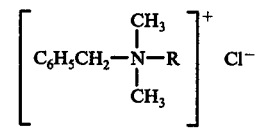

wherein R is a mixture of alkyl groups having from 8 to 18 carbon atoms but predominantly C$_{12}$.

11. A composition according to claim 10 wherein the quaternary ammonium compound is present in a quantity of from 0.4 to 5.0% by weight of the dry weight of the dispersion.

12. A composition according to claim 11 wherein the quaternary ammonium compound is present in a quantity of from 1.5 to 3.0% by weight.

13. A composition according to claim 8 wherein the ammonium polyphosphate is obtained by neutralization of a polyphosphoric acid which comprises from 80 to 82% by weight of phosphorus pentoxide.

14. A composition according to claim 13 wherein the ammonium polyphosphate is present in a quantity of from 2.0 to 30% by weight of the dry composition.

15. A composition according to claim 1 wherein R' is a benzyl group having at least one alkyl substituent which contains from 8 to 15 carbon atoms or an alkyl group having from 8 to 20 carbon atoms.

16. A composition according to claim 15 wherein R'''' is a phenyl oxyalkylene group having from 1 to 6 oxyalkylene groups.

17. A composition according to claim 15 wherein R'''' is an alkyl group having from 8 to 18 carbon atoms.

18. A composition according to claim 15 wherein the quaternary ammonium compound is present in a quantity of from 0.4 to 5.0% by weight of the dry weight of the dispersion.

19. A composition according to claim 18 wherein the quaternary ammonium compound is present in a quantity of from 1.5 to 3.0% by weight.

20. A composition according to claim 1 wherein the ammonium polyphosphate is obtained by neutralization of a polyphosphoric acid which comprises from 80 to 82% by weight of phosphorus pentoxide.

21. A composition according to claim 20 wherein the ammonium polyphosphate is present in a quantity of from 2.0 to 30% by weight of the dry composition.

22. A composition according to claim 21 wherein the ammonium polyphosphate is present in a quantity of from 15 to 25% by weight.

23. A composition according to claim 22 wherein the carbamic acid derivative is present in a quantity of from 1 to 20% by weight of the dry dispersion.

24. A composition according to claim 1 wherein the carbamic acid derivative is urea.

25. A composition according to claim 24 wherein the carbamic acid derivative is present in a quantity of from 1 to 20% by weight of the dry dispersion.

26. A composition according to claim 25 wherein the carbamic acid derivative is present in a quantity of from 5 to 15% by weight.

27. A composition according to claim 1 wherein the hydrotrope is a phosphate ester which is derived from a fatty alcohol having from 11 to 16 carbon atoms per molecule.

28. A composition according to claim 27 wherein the fatty alcohol comprises an average of 5 to 9 moles of ethylene oxide per mole of alcohol.

* * * * *

UNITED STATES PATENT AND TRADEMARK OFFICE
CERTIFICATE OF CORRECTION

PATENT NO. : 4,105,566
DATED : August 8, 1978
INVENTOR(S) : GLYNN MILLER et al

It is certified that error appears in the above-identified patent and that said Letters Patent are hereby corrected as shown below:

Column 8, line 10: replace "1.5 : 2.0." with
---1.5 - 2.0 : 1.---.

Column 10, line 36: replace "1" with ---27---.

Signed and Sealed this

Twenty-sixth Day of February 1980

[SEAL]

Attest:

SIDNEY A. DIAMOND

Attesting Officer

Commissioner of Patents and Trademarks